(12) United States Patent
Fillipo et al.

(10) Patent No.: US 9,519,963 B2
(45) Date of Patent: Dec. 13, 2016

(54) DEVICE AND METHOD FOR ANALYSIS OF COATING ADDITIVE PERFORMANCE

(71) Applicant: HERCULES INCORPORATED, Wilmington, DE (US)

(72) Inventors: Bruce K Fillipo, Springfield, PA (US); Sowmitri Tarimala, Wilmington, DE (US)

(73) Assignee: HERCULES LLC, Wilmington, DE (US)

( * ) Notice: Subject to any disclaimer, the term of this patent is extended or adjusted under 35 U.S.C. 154(b) by 218 days.

(21) Appl. No.: 14/268,038

(22) Filed: May 2, 2014

(65) Prior Publication Data
US 2014/0328533 A1 Nov. 6, 2014

Related U.S. Application Data

(60) Provisional application No. 61/820,004, filed on May 6, 2013.

(51) Int. Cl.
*G06T 7/00* (2006.01)
*G06K 9/32* (2006.01)

(52) U.S. Cl.
CPC .......... *G06T 7/0008* (2013.01); *G06K 9/3233* (2013.01); *G06T 7/0004* (2013.01); *G06T 2207/10056* (2013.01); *G06T 2207/30108* (2013.01)

(58) Field of Classification Search
None
See application file for complete search history.

(56) References Cited

U.S. PATENT DOCUMENTS

| 7,916,927 | B2 * | 3/2011 | Cramer | G03F 7/70625 382/141 |
| 2005/0076706 | A1 * | 4/2005 | Sergoyan | G01M 3/223 73/40.7 |
| 2009/0185714 | A1 * | 7/2009 | Lindberg | G01N 15/1456 382/100 |
| 2010/0260926 | A1 * | 10/2010 | Wolfe | G01N 21/8422 427/8 |

OTHER PUBLICATIONS

Tarimala et al. "Quantitative Performance Assessment of New Foam Control Agents in Waterborne Coatings", European Coatings Journal 11, 2013, pp. 16-20.

* cited by examiner

*Primary Examiner* — Siamak Harandi
(74) *Attorney, Agent, or Firm* — Dunlap Codding, P.C.; Shaorong Chen

(57) ABSTRACT

A product testing apparatus is described as having one or more imager configured to capture one or more images of a sample having a substrate coating applied to a substrate, a processor in communication with the imager, and a non-transitory processor readable medium, in communication with the processor. The non-transitory processor readable medium stores processor executable instructions that when executed cause the processor to receive the one or more images from the one or more imager. The processor then processes the one or more image by filtering lighting variations in the pixels of the one or more images to identify one or more objects of interest in the one or more images of the cured/uncured substrate coating. The processor quantifies one or more property of the one or more objects of interest. The processor executable instructions then cause the processor to generate one or more signal indicative of the quantification of the one or more objects of interest.

21 Claims, 5 Drawing Sheets

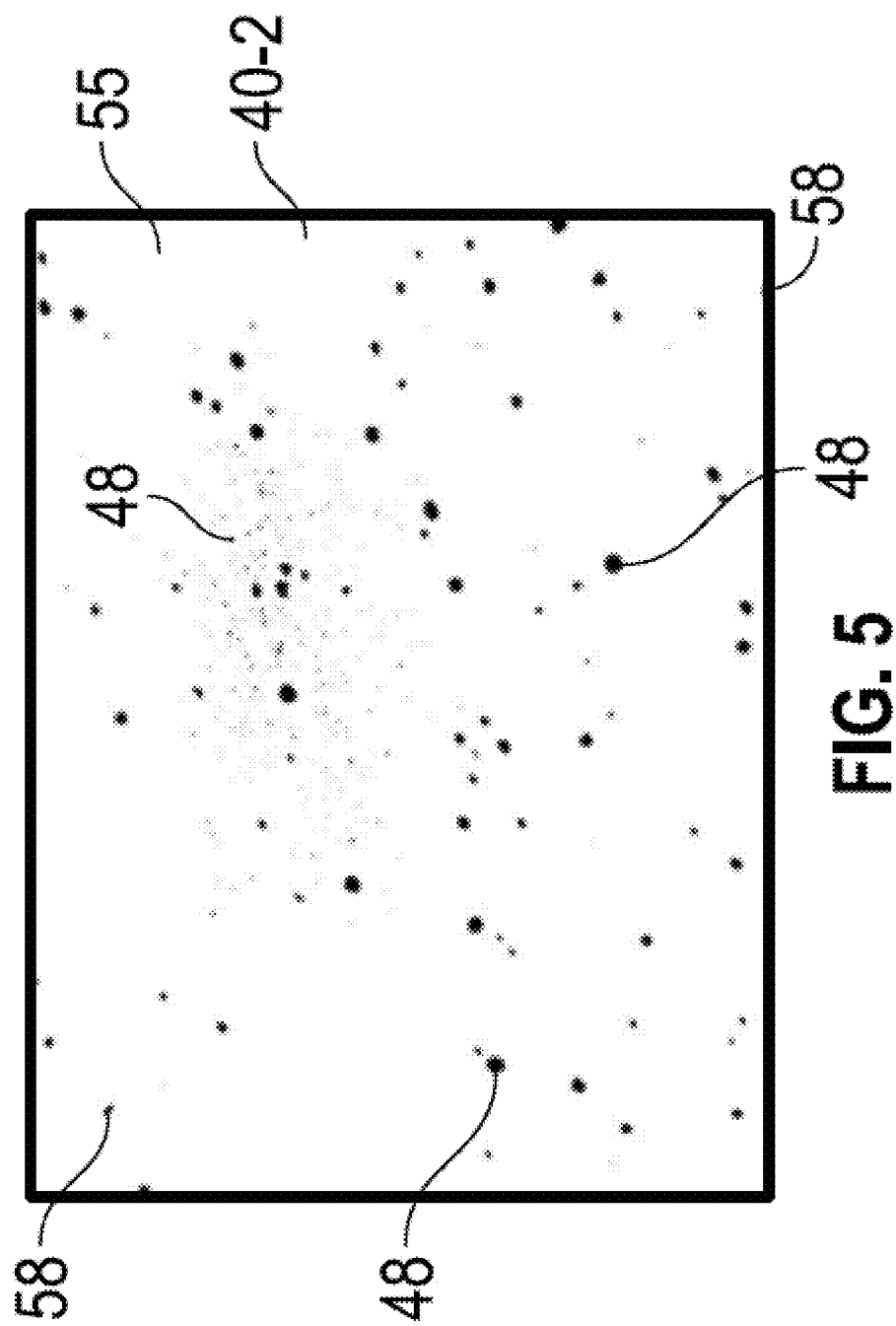

DEVICE AND METHOD FOR ANALYSIS OF COATING ADDITIVE PERFORMANCE

CROSS REFERENCE TO RELATED APPLICATIONS

The present application claims the benefit under 35 U.S.C. 119(e) of U.S. Provisional Patent Application Ser. No. 61/820,004, filed May 6, 2013, the entire content of which is hereby expressly incorporated herein by reference.

BACKGROUND OF THE INVENTION

1. Field of the Presently Disclosed and Claimed Inventive Concept(s)

The presently disclosed and claimed inventive concept(s) relates generally to a product testing apparatus. More particularly, the apparatus comprises a microscope having a microscopic imaging device and at least one data processing system. The microscopic imaging device is configured to capture one or more images indicative of a sample having a substrate coating applied to a substrate. The data processing system have a processor, one or more non-transitory processor readable medium, and processor executable instructions stored on the non-transitory processor readable medium that when executed cause the processor to receive the one or more images captured by the microscopic imaging device. The processor then processes the one or more images by filtering lighting variations in the one or more images to identify one or more objects of interest in the substrate coating; quantifies the one or more objects of interest; and generates a signal indicative of the quantification of the one or more objects of interest.

2. Background and Applicable Aspects of the Presently Disclosed and Claimed Inventive Concept(s)

The coatings industry is constantly evolving to keep pace with emerging technology and consumer trends. Some such trends are $TiO_2$ optimization, low-odor, low-voc, green materials, and sustainable materials among others which are driven by performance, cost, environmental and regulatory concerns. These trends pose challenges to formulators as well as specialty chemical companies globally to achieve performance in these new coatings systems by changing coating formulations significantly. Some examples include changes to the latex, composition and levels of rheology modifiers, coalescing agents, surfactants and glycols among others. These formulation changes generally result in increased levels of microfoam and macrofoam in manufacturing, packaging, and application of these new coatings where traditional foam control agents (FCAs) are often determined to be not efficient or efficacious enough.

These challenges drive development of new additives for foam control that are more efficient at foam destruction, but that do not adversely affect other paint film properties such as film quality, gloss, etc. During development and testing, performance of foam control additives and agents are typically assessed by methods including foam knockdown in surfactant solutions, process foam in paint, application foam in paint, and compatibility. These methods include shaker studies, closed-loop circulation tests, air entrainment, brush outs, foam taps, rollouts, bubble break by visual observation, and drawdowns to determine surface defects, gloss, color acceptance and tint strength. Foam knockdown tests in surfactant systems may not be representative of foam performance in actual paint systems. Some test methods, especially for application foam, allow differentiation between sample coating candidates but assessments within these methods are often the weakest link. The assessments are typically qualitative in nature and subjective, based on a person performing the assessment. The results are routinely expressed based on arbitrary ranking systems that are relative and differentiating between sample coating candidates is difficult.

One of the evaluation criteria of a foam control agent or additive is bubble break, which is the rate at which foam bubbles collapse. Assessment of bubble break is non-trivial and is traditionally monitored by visual observation. The bubble break is typically recorded as the time it takes for ninety to one hundred percent of the bubbles to break over a period of five minutes or expressed as a relative ranking of the rate of bubble break on an arbitrary scale. Such subjective method of evaluation lacks accuracy and repeatability. Hence, new techniques are needed to accurately characterize and differentiate foam control agent performance and provide additional insight into defoaming mechanisms.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one embodiment, a product testing apparatus is described. The product testing apparatus has one or more imager configured to capture one or more images of a sample having a substrate coating applied to a substrate, a processor in communication with the one or more imager, and a non-transitory processor readable medium, in communication with the processor. The non-transitory processor readable medium stores processor executable instructions that when executed cause the processor to receive the one or more images of the substrate coating captured by the one or more imager. The processor executable instructions cause the processor to process the one or more images by filtering lighting variations in the pixels of the one or more images to identify one or more objects of interest in the one or more images of the substrate coating. The processor executable instructions then cause the processor to quantify one or more property of the one or more objects of interest. The processor executable instructions then cause the processor to generate one or more signal indicative of the quantification of the one or more objects of interest.

In another embodiment, the product testing apparatus is described as having a microscope having a microscopic imaging device configured to capture one or more images indicative of a sample having a substrate coating applied to a substrate, and at least one data processing system operably connected to the microscope. The data processing system has a processor, one or more non-transitory processor readable medium, and processor executable instructions stored on the non-transitory processor readable medium that when executed cause the processor to receive the one or more images captured by the microscopic imaging device. The processor then processes the one or more images by filtering lighting variations in the one or more images to identify one or more objects of interest in the substrate coating. The processor then quantifies the one or more objects of interest and generates a signal indicative of the quantification of the one or more objects of interest.

In another version, one or more non-transitory processor readable medium is described as storing processor executable instructions that when executed by one or more processor causes the one or more processor to receive one or more images indicative of a sample of a substrate coating applied to a substrate. The processor executable instructions then cause the one or more processor to differentiate between one or more objects of interest in the substrate coating and other objects within the one or more image. The processor then quantifies the one or more objects of interest within the one or more image, and generates a signal indicative of quantification of the one or more objects of interest within one or more binary image.

In another version, a method is described. The method, comprising: analyzing an image of a sample having a substrate coating applied to a substrate, by a data processing system having a processor, one or more non-transitory processor readable medium, and processor executable instructions configured to process the image and quantify one or more objects of interest in the substrate coating: processing the image by filtering lighting variations in pixels of the one or more images to identify the one or more objects of interest in the one or more images of the substrate coating; quantifying the one or more objects of interest; and generating one or more signal indicative of the quantification of the one or more objects of interest.

BRIEF DESCRIPTION OF THE SEVERAL VIEWS OF THE DRAWINGS

FIG. 5 is an embodiment of an exemplary binary image processed from the filtered image of FIG. 4 by the product testing apparatus according to the present disclosure.

DETAILED DESCRIPTION

Figure 1:
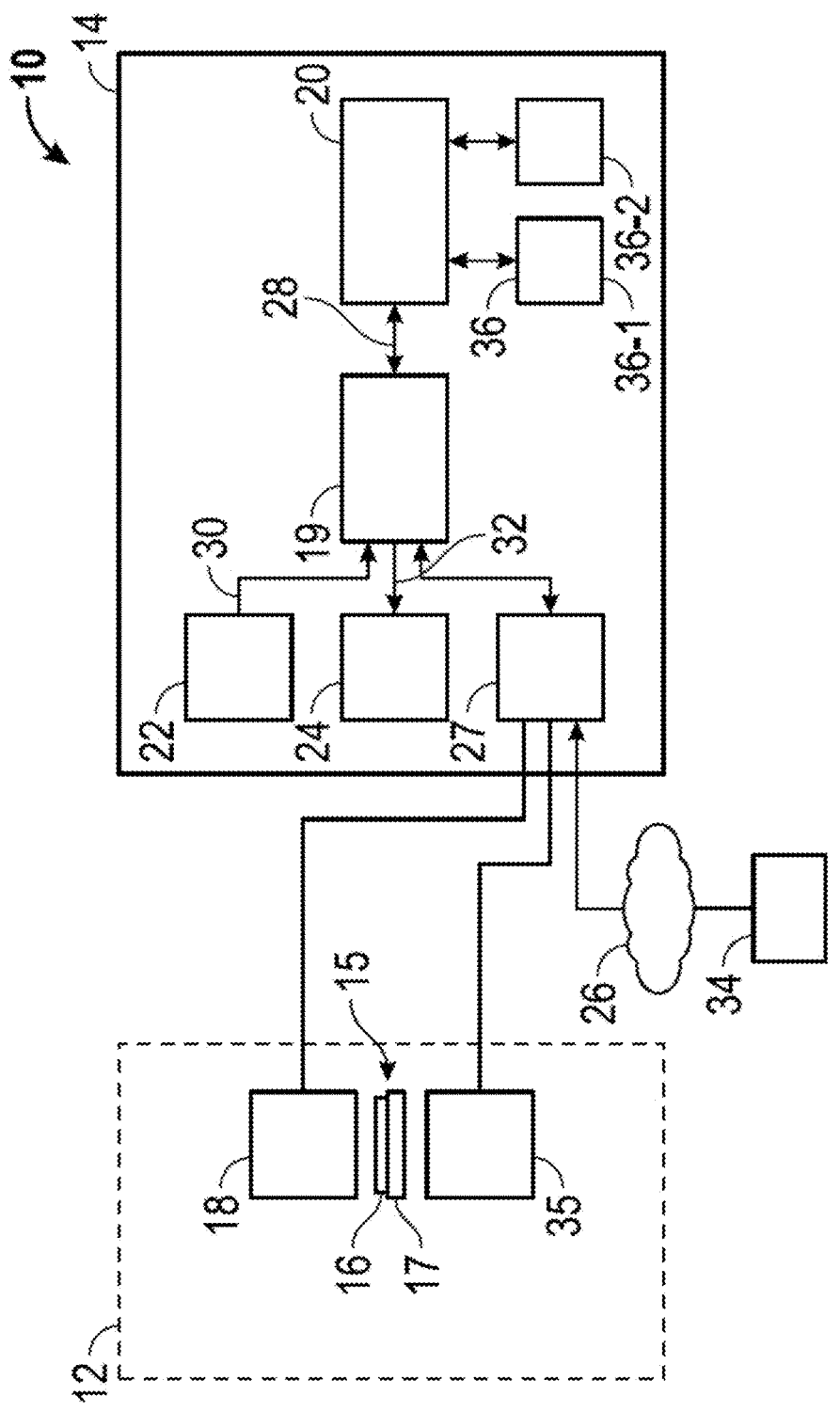
FIG. 1 is a schematic diagram of an exemplary embodiment of a product testing apparatus according to the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

The inventive concepts disclosed herein are generally directed to a method and system for testing products, and more particularly, but not by way of limitation to a product testing apparatus for measuring quantities of objects of interest such as bubbles within a substrate coating having unknown performance characteristics after the substrate coating is applied to a substrate and converting the measured quantities into an output signal representative of one or more performance characteristics of the substrate coating to be tested. Thus, the product testing apparatus may provide a quantitative analysis with respect to how the substrate coating performs after application to the substrate. The product testing apparatus will be described hereinafter in the context of testing a substrate coating known as "paint," typically having a homogeneous appearance in the absence of bubbles; grit, dirt, and other foreign objects; and other imperfections but it is to be understood that the instant inventive concepts are equally applicable to other types of substrate coatings including consumer products, industrial products, or the like, as will be understood by a person of ordinary skill in the art presented with the instant disclosure.

As used herein, the terms "network-based," "cloud-based," and any variations thereof, are intended to cover the provision of configurable computational resources on demand via interfacing with a computer network, with software and/or data at least partially located on the computer network, by pooling the processing power of two or more networked processors.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

It is to be further understood that as used herein the term "user" or "evaluator" and variations thereof is not limited to a human being, and may comprise a robot or electromechanical device configured to apply a substrate coating to at least a portion of the substrate.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to FIG. 1, shown therein is an exemplary embodiment of a product testing apparatus 10 according to the instant disclosure. The product testing apparatus 10 may be provided with one or more imager 12 and at least one data processing system 14 operably coupled to the one or more imager 12. The imager 12 may be configured to capture one or more images indicative of a sample 15 having a substrate coating 16 applied to a substrate 17. The at least one data processing system 14 may store processor executable instructions configured to enable the at least one data processing system 14 to analyze the sample 15.

The imager 12 may be implemented as a single imaging device or multiple imaging devices. The imager 12 includes an image capture device 18, which may include or be implemented as a CCD, a CCD array, a CMOS, a 2D CCD array, a digital camera, or a microscope, for example. In one embodiment, where the image capture device 18 includes a microscope having a microscopic lens device and is capable of between five and two hundred forty times magnification. The image capture device 18 captures images of the sample 15 and enables the data processing system 14 to analyze objects of interest as small as one micron and as large as five mm within the images, for example using ten, twenty, thirty, forty, fifty, fifty-five, two hundred five, and two hundred forty times magnification with varying fields of view depending on the magnification in use. The image capture device 18 may have varying pixel resolution at varying magnifications in addition to varying fields of view. The imager 12 may be operably coupled to the at least one data processing system 14 such that the one or more images of the sample 15, captured by the imager 12, may be transmitted to the at least one data processing system 14. For example, the imager 12 may be operably coupled to the data processing system 14 via a wired or wireless connection. In some embodiments, the imager 12 may be located remotely from the data processing system 14 and communicate over a communications network, as will be explained in more detail below. Further, the imager 12 may save the images on a file server of the data processing system 14.

The at least one data processing system 14 may comprise one or more processor 19 capable of executing processor executable instructions, one or more non-transitory processor readable medium 20 capable of storing processor executable instructions and other data, one or more input device 22, and one or more output device 24, all of which may be partially or completely network-based or cloud-based, and may not necessarily be located in a single physical location. The data processing system 14 may be connected to a communications network 26. In some exemplary embodiments, the data processing system 14 may communicate with the imager 12 via the communications network 26.

The processor 19 can be implemented as a single processor or multiple processors working together to execute processor executable instructions including the logic described herein. Exemplary embodiments of the processor 19 may include a digital signal processor (DSP), a central processing unit (CPU), a field programmable gate array (FPGA), a microprocessor, a multi-core processor, a quantum processor, application-specific integrated circuit (ASIC), a graphics processing unit (GPU), a visual processing unit (VPU), and combinations thereof. The processor 19 is operably coupled with the non-transitory processor readable medium 20 via a path 28 which can be implemented as a data bus allowing bi-directional communication between the processor 19 and the non-transitory processor readable medium 20, for example. The processor 19 is capable of communicating with the input device 22 and with the output device 24 via paths 30 and 32 including one or more data busses, for example. The paths 28, 30, and 32 may include a serial topology, a multidrop topology, a daisy chain topology, a parallel topology, a proprietary topology, one or more switched hubs, or combinations thereof. The processor 19 may be further capable of interfacing and/or bi-directionally communicating with the imager 12 via the network 26, such as by exchanging electronic, digital, analogue, and/or optical signals via a communications device 27. The communications device 27 may be one or more physical, virtual, or logical ports using any desired network protocol such as TCP/IP, for example. It is to be understood that in certain embodiments using more than one processor 19, multiple processors 19 may be located remotely from one another, located in the same location, or comprising a unitary multi-core processor (not shown). The processor 19 is capable of reading and/or executing processor executable instructions stored in the one or more non-transitory processor readable medium 20 and/or of creating, manipulating, altering, and storing processor readable data structures into the one or more non-transitory processor readable medium 20.

The non-transitory processor readable medium 20 may store an image processing and analysis program having processor executable instructions. The non-transitory processor readable medium 20 may be implemented as any type of memory, such as random access memory (RAM), a CD-ROM, a hard drive, a solid state drive, a flash drive, a memory card, a DVD-ROM, a floppy disk, an optical drive, and combinations thereof, for example. While the non-transitory processor readable medium 20 may be located in the same physical location as the processor 19, the non-transitory processor readable medium 20 may also be located remotely from the processor 19 and may communicate with the processor 19 via the network 26. Additionally, when more than one non-transitory processor readable medium 20 is used, one or more non-transitory processor readable medium 20 may be located in the same physical location as the processor 19, and one or more non-transitory processor readable medium 20 may be located in a remote physical location from the processor 19. The physical location of the non-transitory processor readable medium 20 can be varied, and the non-transitory processor readable medium 20 may be implemented as a "cloud memory" i. e., one or more non-transitory processor readable medium 20 which is partially, or completely based on or accessed using the network 26, for example. Further, the one or more processor 19 may not communicate directly with the non-transitory processor readable medium 20, but may communicate with another processor 19 communicating with the non-transitory processor readable medium 20 over the network 26, for example. In some exemplary embodiments, the processor 19 may include a first processor 19 communicating with a second processor 19 executing processor executable instructions including an image processing and analysis program over the network 26. The second processor 19 may be part of a computer station (not shown), or may be a part of a separate computer system or server configured to communicate with the imager 12 over the network 26 or otherwise operably coupled with the imager 12, for example.

The input device 22 may pass data to the processor 19, and may be implemented as a keyboard, a mouse, a stylus, a trackball, a touch-screen, a camera, a cellular phone, a tablet, a smart phone, a personal digital assistant (PDA), a microphone, a network adapter, and combinations thereof, for example. The input device 22 may be located in the same physical location as the processor 19, or may be remotely located and/or partially or completely network-based.

The output device 24 passes information from the processor 19 to a user in a user perceivable format. For example, the output device 24 can be implemented as a server, a computer monitor, a cell phone, a smartphone, a tablet, a speaker, a website, a PDA, a fax, a printer, a projector, a laptop monitor, and combinations thereof. The term "pass" as used herein may refer to either push technology, or to pull technology, and to combinations thereof.

The output device 24 can be physically co-located with the processor 19, or can be located remotely from the processor 19, and may be partially or completely network based (e.g., a website). As used herein the term "user" is not limited to a human, and may comprise a human, a computer, a host system, a smart phone, a tablet, and combinations thereof, for example.

The network 26 may be implemented as a wireless and/or wired network (e.g., the world wide web or Internet, or any other computer network configured to allow bidirectional exchange of data and/or signals between computer processors), and may permit bi-directional communication of information and/or data between the data processing system 14, one or more imaging device 12, and/or one or more user device 34 operably coupled with the network 26, for example.

The network 26 may interface with the data processing system 14 and with the imager 12 and/or user device 34 operably coupled with the network 26 in a variety of ways, such as by optical, wireless, wired, and/or electronic interfaces, and may use a plurality of network topographies and protocols, such as Ethernet, TCP/IP, circuit switched paths, and combinations thereof, for example. The network 26 may use a variety of network protocols to permit bi-directional interface and communication of data and/or information between the data processing system 14, the imager 12, and/or the user device 34 operably coupled with the network 26. The network 26 may be secured using any desired secured networking protocol, such as a gateway server, a firewall, data encryption, public or private key cryptography infrastructure, secure socket layer protocol, hypertext transfer protocol secure, a virtual private network, a tunnel, secure shell, and any combinations thereof, for example.

The user device 34 may be connected or otherwise operably coupled with the network 26, and can be implemented as a smartphone, a tablet, a laptop computer, a personal computer, a desktop computer, a computer terminal, a computer workstation, an e-book reader, a wireless network-capable handheld device, a digital video recorder, a personal digital assistant, a kiosk, an emergency telephone station, or combinations thereof, for example. Similar to the data processing system 14, described above, in one embodiment, the user device 34 may be provided with one or more processor (not shown), one or more non-transitory processor readable medium (not shown), an input device (not shown), and an output device (not shown), each implemented similar to or the same as described above. The user device 34 may be capable of wirelessly interfacing with the network 26. The one or more non-transitory processor readable medium of the user device 34 may store processor executable instructions or software applications, and a web browser or a smartphone application (e.g., native software application running on the user device 34 and configured to communicate with a web server over a computer network) running on the user device 34 and capable of accessing a website and/or communicating information and/or data with a web server such as the data processing system 14 over the network 26.

In one embodiment, the imager 12 of the product testing apparatus 10 may include a light source 35 configured to illuminate the sample 15. In some exemplary embodiments, the light source 35 may be positioned to provide backlighting to the sample 15 in which photons pass sequentially through the substrate 17 and the substrate coating 16, where the substrate 17 is transparent. In other exemplary embodiments, the light source 35 may be positioned to provide side lighting of the sample 15 such that reflections of photons are directed to the image capture device 18, where the substrate 17 is opaque. The light source may be implemented as a light emitting diode (LED), an incandescent light, a fluorescent light, or any other suitable light source 35 capable of illuminating the sample 15 with photons in the visible or non-visible regions. Exemplary non-visible regions include infrared and ultra-violet regions of the light spectrum. The light source 35 may be operably connected to the imager 12 and/or the data processing system 14, as shown in FIG. 1. In one embodiment, the light source 35 may be an integral part of the image capture device 18. In other embodiments, the light source 35 may be separate from the image capture device 18 as a lamp, an overhead light, or ambient lighting within a room.

The product testing apparatus 10 may include processor executable instructions 36 which may comprise one or more computer program having processor executable instructions written in any suitable programming language, such as C++, C#, Java, Python, Perl, Binary, assembly language, or other high or low level programming language. The processor executable instructions 36 for the product testing apparatus 10 according to the inventive concepts disclosed herein may be implemented as software, firmware, or a combination of software and firmware, for example, and may be at least partially stored in the non-transitory processor readable medium 20. The data processing system 14 may access and execute the processor executable instructions 36 to execute an image processing and analysis program 36-1, for example.

In some exemplary embodiments, the processor executable instructions 36 include an image processing and analysis program 36-1. The non-transitory processor readable medium 20 may also store other processor executable instructions 36-2 such as an operating system and application programs such as a word processor or spreadsheet program, for example. The processor executable instructions for the image processing and analysis program 36-1 and other processor executable instructions 36-2 may be written in any suitable high level or low level programming language as described above.

Figure 2:
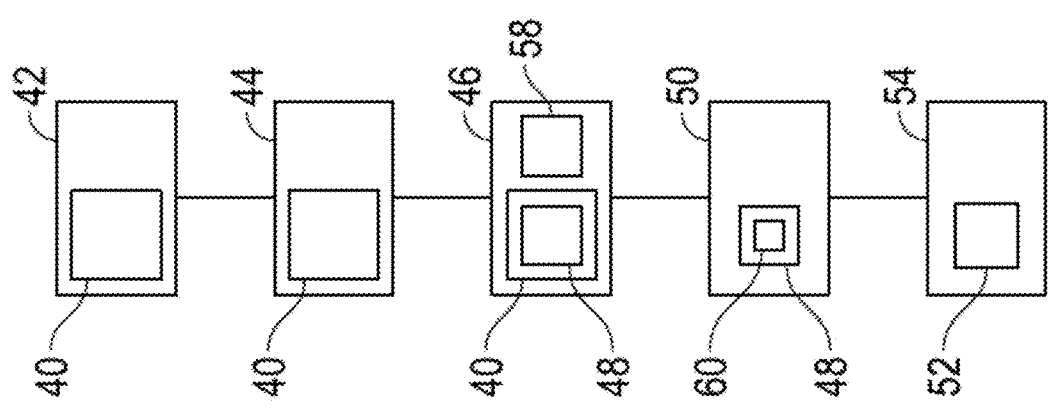
FIG. 2 is a block diagram of the execution of processor executable instructions stored on a non-transitory processor readable medium according to the present disclosure.
Figure 3:
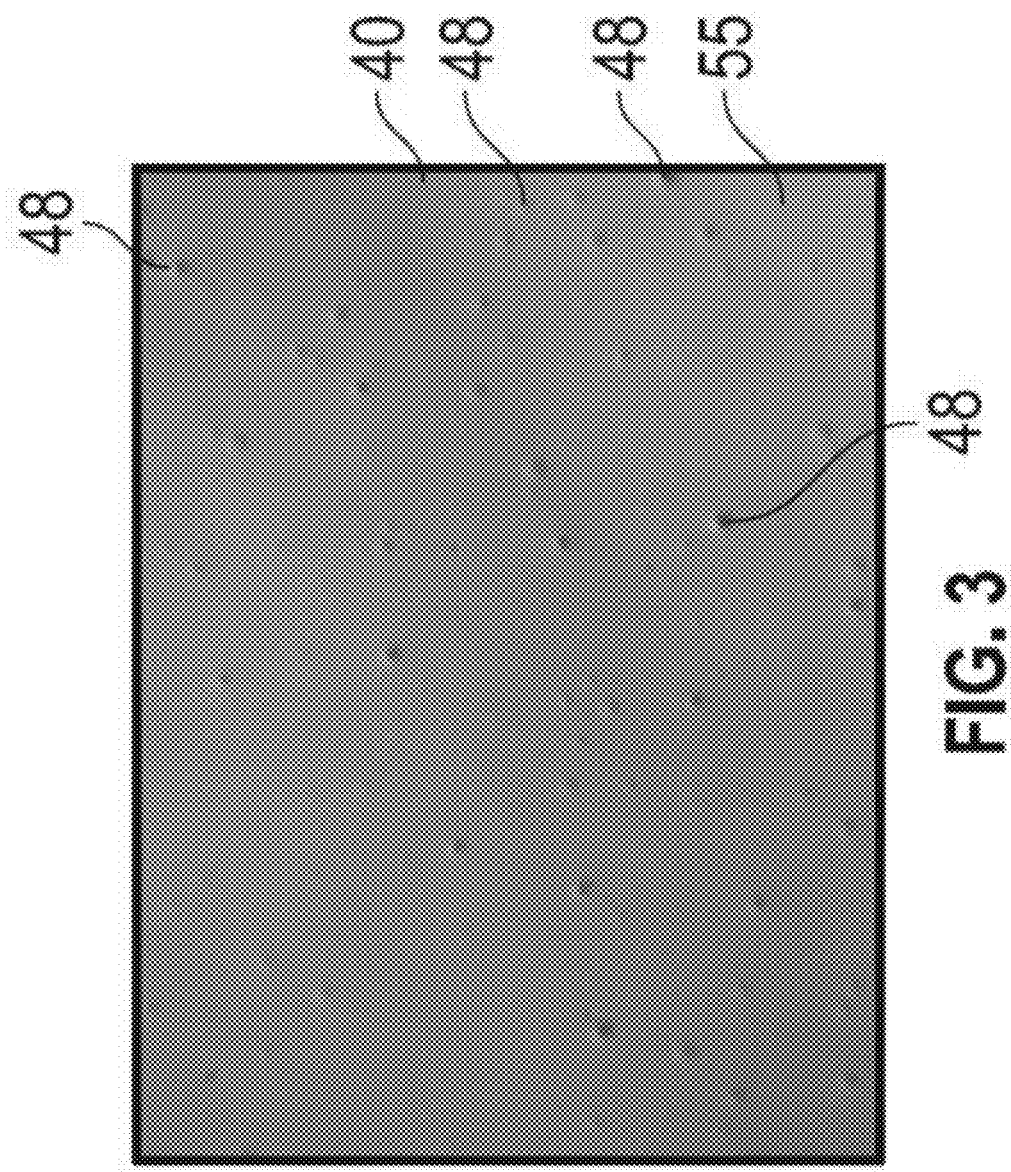
FIG. 3 is an embodiment of an exemplary image captured by an imager of the product testing apparatus according to the present disclosure.
Figure 4:
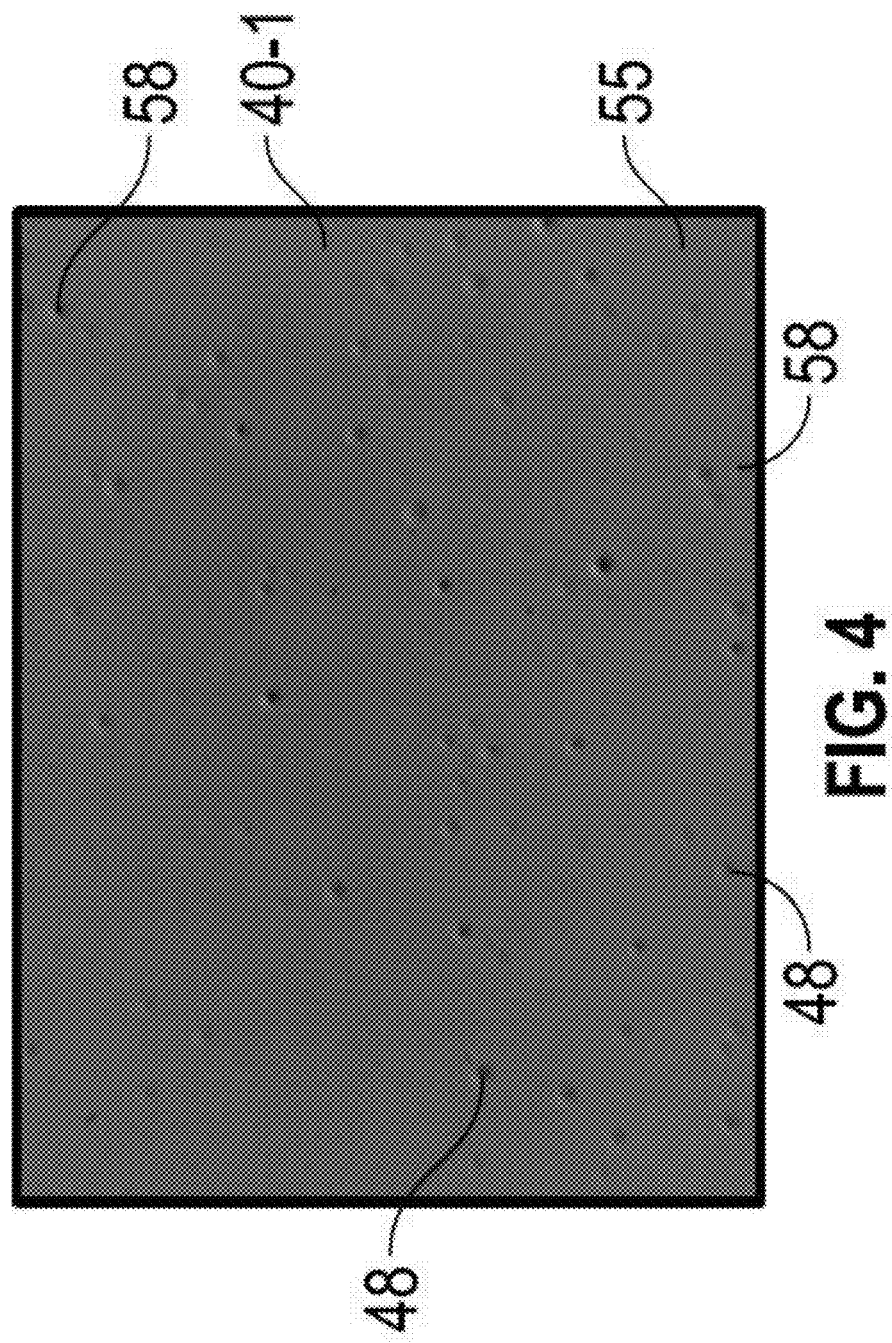
FIG. 4 is an embodiment of an exemplary filtered image processed from the image of FIG. 3 by the product testing apparatus according to the present disclosure.

Referring now to FIG. 2, therein shown is a representation of the execution of one embodiment of the image analysis and processing program 36-1. The image analysis and processing program 36-1, as discussed above, may be stored on the one or more non-transitory processor readable medium 20 and when executed, may cause the processor 19 to send a signal to the image capture device 18 to cause the image capture device 18 to capture one or more images 40 of the sample 15, as indicated by block 42 and as shown in FIG. 2. The image 40 has a background 55 and the one or more objects of interest 48. In the example shown in FIG. 3, the objects of interest are bubbles and the image 40 is captured after the substrate coating 16 being fully cured. In other words, the images 40 are indicative of the cured/dried substrate coating 16. Images of uncured substrates or wet coating films or coating films in the process of drying may also be captured (not shown). The image analysis and processing program 36-1 may cause the processor 19 to receive the one or more images 40 from the imaging device 12, as indicated by block 44. The processor 19 may process the one or more images 40, as indicated by block 46 and as shown in FIGS. 4 and 5, as will be explained in more detail below, to identify one or more objects of interest 48 in the substrate coating 16. The image analysis and processing program 36-1 may cause the processor 19 to quantify one or more property of the one or more objects of interest 48, as indicated by block 50, as will be explained in more detail below. The processor 19 may then generate one or more signal 52 indicative of the quantification of the objects of interest 48, as indicated by block 54.

At block 46, the image analysis and processing program 36-1 may cause the processor 19 to process the one or more images 40. In general, the objects of interest 48 are representative of differing levels of contrast within the one or more image 40. Processing the one or more images 40 may be performed by filtering lighting variations in the pixels of the one or more images 40 to identify the differences in contrast and thereby identify one or more objects of interest 48 in the substrate coating 16 of the sample 15. In one embodiment, a band pass filter may be used on the one or more images 40 to distinguish the one or more objects of interest 48 by enhancing edges through suppression of low frequencies and reducing noise by attenuating high frequencies. An exemplary embodiment of a filtered image 40-1, filtered using a band pass filter, is shown in FIG. 4. The filtered image 40-1 of FIG. 4 may be generated by filtering the image 40 displayed in FIG. 3. The processor 19 may filter lighting variations of the filtered image by thresholding the filtered image 40-1 to determine changes in color/gray scale of the pixels within the filtered image 40-1. Thresholding is an image segmentation process enabling the creation of a binary image, where pixels of the image have only one of two possible values. Thresholding may be performed by histogram shape-based methods, clustering-based methods, entropy-based methods, object attribute-based methods, spatial methods, and local methods, for example. The processor 19 may also perform other filtering and image processing operations on the one or more images 40, such as cropping edges, sharpening focus, and other image processing operations configured to distinguish the one or more objects of interest 48 from the background 55 to identify the objects of interest 48.

The changes in color may be indicative of the objects of interest 48 within the one or more images 40. For example, where the substrate coating 16 of the sample 15 is paint and is backlit, lighter color sections may indicate the presence of the one or more object of interest 48, in this case a bubble indicative of foam within the sample 15. In another embodiment, where the sample 15 with the substrate coating 16 of paint is lit from the coated side of the substrate 17 or from an angle other than backlighting, the processor 19 may identify darker color sections of the sample 15 as indicative of the one or more objects of interest 48, in this case bubbles forming the foam. In either event, the processor 19 may filter the image 40 to identify lighting variations to enhance contrast between the one or more objects of interest 48 and the background 55 of the sample 15. In one embodiment, the processor 19 may enhance the contrast by transforming one or more color values of the pixels of the image 40. In another embodiment, the processor 19 may remove one or more of the color values of the pixels of the image 40, shown in FIG. 3, thereby generating a gray scale version of the one or more image 40 and to create the one or more filtered image 40-1, as shown in FIG. 4. The filtered image 40-1 may be generated by removing information from the pixels of the image 40, leaving only the intensity information for each pixel, thereby generating the filtered image 40-1 composed of primarily shades of gray varying between black and white. As shown in FIG. 4, the filtered image 40-1 contains the one or more objects of interest 48, the background 55, and one or more other objects 58, present in the one or more image 40 with the color values of the pixels of the one or more image 40 removed. In one embodiment, the image processing and analysis program 36-1 may further cause the processor 19 to convert the one or more filtered image 40-1 into one or more binary image 40-2, as shown in FIG. 5, to further highlight potential objects of interest 48. The processor 19 may convert the filtered image 40-1 to the one or more binary images 40-2 by converting the pixels within the filtered image 40-1 to only two possible values. For example, the processor 19 may analyze the color values of the one or more filtered image 40-1 and convert pixels having a value above a predetermined color value to black and convert pixels having a value below the predetermined color value to white. In this embodiment, the contrast between light and dark areas of the sample 15 may be enhanced such that the processor may identify the objects of interest 48 within the binary image 40-2.

After processing the one or more image 40, the processor 19 may identify the objects of interest 48 by comparing pixels representing the objects of interest 48 with one or more features. In one embodiment, where the one or more objects of interest 48 are bubbles, the processor 19 may identify the bubbles by comparing the shape of the groups of pixels having the same value with the shape of circles, arcs, bubble cluster formations, feret diameter, radii, ellipses, circular elements, aspect ratio, and other suitable identifying features that can be used to describe circular and non-circular objects. In one embodiment, where the one or more objects of interest 48 are bubbles, the processor 19 may differentiate between the one or more objects of interest 48 and one or more other objects 58 based upon the shape of groups of pixels having the same value. In one embodiment, the one or more other objects 58 may be grit, dirt, foreign objects, and other imperfections. In an exemplary embodiment, for example, the processor 19 may exclude an object within the sample 15 as one of the one or more other objects 58 where the excluded object does not contain a circle, arc, radii, circular element, or combinations thereof, thereby precluding the object from being recognized as a bubble and therefore one of the one or more objects of interest 48. The image processing and analysis program 36-1 may contain processor executable instructions which cause the processor 19 to quantify various properties of the objects of interest 48 by measuring the size of the objects of interest 48, or density of the objects of interest 48. By quantifying and/or correlating the one or more objects of interest 48, the processor 19 may also differentiate between the one or more objects of interest 48 and one or more other objects 58 within the sample 15.

After identifying the one or more object of interest 48, the processor 19 may quantify one or more property 60 of the one or more object of interest 48. In one embodiment, the one or more properties 60 may include a number of objects per predetermined area, a size distribution of the objects, a population of cumulative frequency curves, and kinetics of reduction of objects diameter. The processor 19, quantifying the population of cumulative frequency curves, may depict how more efficient defoamers reduce foam levels and shift an overall population of bubbles to smaller bubble diameter by determining a running total of how many of the objects of interest 48 may fall below a predetermined diameter. In generating signals 52 indicative of the population of cumulative frequency curves, the processor 19 may generate a graph, a spreadsheet, or any appropriate user readable manner of communicating and displaying data. The processor 19, quantifying the kinetics of reduction of foam bubble diameter and count, may depict the manner and timing at which bubbles break and the resulting reduction of foam, including reductions in a size of bubbles within the foam by analyzing sequential images taken at different times while the substrate coating 16 cures.

The processor 19 may generate the signals 52 indicative of the quantification of the identification of the one or more objects of interest 48, the one or more objects of interest 48, and the quantification of the one or more property 60 of the one or more object of interest 48. The processor 19 may then transmit the signals 52 to the output device 24 for presentation to the user in any user perceivable format, including graphs, spreadsheets, word processor documents, and equations, for example.

In use, the user may position the sample 15 such that the sample 15 may be imaged by the image capture device 18. The sample 15 may comprise the substrate 17 having a surface and a substrate coating 16 applied to the surface of the substrate 17. The surface of the substrate 17 may be substantially planar such that light reflected from the substrate coating 16 or through the substrate 17 is not substantially affected by the surface of the substrate 17. Further, the substrate 17 may be transparent or translucent in embodiments of the product testing apparatus 10 using the light source 35 to backlight the sample 15. The substrate 17 may also be opaque in embodiments where the product testing apparatus 10 uses the light source 35 to side light the sample 15. For example, in one embodiment, the substrate coating 16 may be applied to a single side of the substrate 17 in a manner such that foam bubbles are generated in the substrate coating 16. The thickness of substrate coating 16 applied on substrate 17 may vary based on the relevance of the test or end user preference. The substrate 17 may be formed from any material suitable for application of a predetermined substrate coating 16, and may vary depending on the substrate coating 16, the intended form of lighting to be applied to the substrate coating 16, or varied to test an effect of differing substrates 17 on the applied substrate coating 16.

The image capture device 18 may capture the one or more images 40 of the sample 15 as one or more individual image 40 or as a series of images 40. Where the image capture device 18 captures one or more individual images 40, the data processing system 14 may quantify the objects of interest 48 within the one or more individual image 40, thereby quantifying properties 60 of the objects of interest 48 in a static instance of time. Where the imager captures the series of images 40 the data processing system 14 may quantify properties 60 of the objects of interest 48 within the series of images 40 in a static instance of time or across a predetermined time frame. For example, in one embodiment, the image capture device 18 may capture a plurality of images 40 at predetermined time intervals within a predetermined time span. The time intervals and the time span may be varied based on the quantification desired by the user. For example, images 40 may be captured at intervals of two minutes for duration of one hour to monitor bubble rupture and an evolution of surface features of the substrate coating 16 during curing. As another example, images 40 may be captured at one second intervals for five minutes to be played back at fifteen frames per second for the duration of the series of images 40. In either short or long time durations, the data processing system 14 may quantify initial foam, foam retention or breakage across the time span, rate of bubble break, bubble size reduction as a function of time, and other properties 60 of the objects of interest 48 by comparing analyses of the images 40 to one another.

The image processing and analysis program 36-1 may cause the processor 19 to receive the one or more images 40. The processor 19 may then process the one or more images 40 to identify the one or more objects of interest 48, as described above. Processing the one or more images 40 may include batch or sequential processing of multiple images 40 without user intervention. The processor 19 may then analyze the one or more objects of interest to quantify the one or more property 60 of the one or more objects of interest 48, as described above. As discussed above, the processor 19 may quantify the number of foam bubbles per a predetermined area, the size distribution of the foam bubbles, the population of cumulative frequency curves, the kinetics of reduction of foam bubble diameter, the initial foam, the foam retention or breakage across the time span, the rate of bubble break, the bubble size reduction as a function of time, and other properties 60. In some exemplary embodiments, the processor 19 may determine the properties 60 to be quantified automatically based on the identified objects of interest 48. In some exemplary embodiments, the image processing and analysis program 36-1 may be provided with a user interface such that a user may instruct the processor 19 to quantify certain of the one or more properties 60 of the one or more objects of interest 48. Further the user interface may allow the user to instruct the processor 19 to quantify certain of the properties 60 for certain of the one or more images 40 while excluding other properties 60 or excluding analysis of certain of the one or more images 40.

The processor 19 may generate the signals 52 indicative of the quantity of the one or more property 60 of the one or more objects of interest 48 and transmit the signals 52 in a user perceivable format, as described above.

The presently disclosed and claimed inventive concept(s) also relates to a method of using the product testing apparatus. The method is performed by analyzing an image of a sample. The sample has a substrate coating applied to a substrate. The image is analyzed by a data processing system which has a processor, one or more non-transitory processor readable medium, and processor executable instructions configured to process the image and quantify one or more objects of interest in the substrate coating. The method is further performed by processing the image by filtering lighting variations in pixels of the one or more images to identify one or more objects of interest in the one or more images of the substrate coating. The processing the image can further comprise converting the image to a binary image.

The method is further performed by quantifying the one or more objects of interest, and generating one or more signal indicative of the quantification of the one or more objects of interest.

The substrate coating can be a cured/uncured substrate coating. In one non-limiting embodiment, the one or more objects of interest are bubbles comprising foam. In another non-limiting embodiment, the one or more objects of interest in the substrate coating are identified by comparison of groups of pixels to features from a group comprising: circles, arcs, bubble cluster formations, radii, ellipses, and circular elements.

The quantifying the one or more objects of interest is defined further as quantifying at least one of a number of objects per a predetermined area, a size distribution of the objects, a population of cumulative frequency curves, and kinetics of reduction of object diameter and count.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and spirit of the inventive concepts disclosed herein and defined by the appended claims.

What is claimed is:

1. A product testing apparatus, comprising:
    a microscope having a microscopic imaging device configured to capture one or more images indicative of a sample having a cured substrate coating applied to a substrate; and
    at least one data processing system having a processor, one or more nontransitory processor readable medium, and processor executable instructions stored on the one or more non-transitory processor readable medium that when executed cause the processor to:
        receive the one or more images captured by the microscopic imaging device;
        process the one or more images by filtering lighting variations in the one or more images to identify one or more objects of interest in the cured substrate coating;
        quantify the one or more objects of interest; and
        generate a signal indicative of the quantification of the one or more objects of interest.

2. The product testing apparatus of claim 1 further comprising a light source configured to illuminate the sample to be imaged.

3. The product testing apparatus of claim 1, wherein processing the one or more images further comprises converting the one or more images to one or more binary images.

4. The product testing apparatus of claim 1, wherein the one or more objects of interest are bubbles comprising foam.

5. The product testing apparatus of claim 4, wherein the one or more objects of interest further comprise one or more other objects comprising grit, dirt, and imperfections within the cured substrate coating.

6. The product testing apparatus of claim 1, wherein the processor executable instructions when executed by the processor cause the processor to identify the one or more objects of interest in the cured substrate coating by a comparison of groups of pixels to features from a group comprising: circles, arcs, bubble cluster formations, radii, ellipses, and circular elements.

7. The product testing apparatus of claim 1, wherein quantifying the one or more objects of interest is defined further as quantifying at least one of a number of objects per a predetermined area, a size distribution of the objects, a population of cumulative frequency curves, and kinetics of reduction of objects diameter and count.

8. One or more non-transitory processor readable medium storing processor executable instructions that when executed by one or more processor causes the one or more processor to:
    receive one or more images indicative of a sample of a cured substrate coating applied to the substrate;
    differentiate between one or more objects of interest in the cured substrate coating and other objects within the one or more images by analyzing variations in colors within the one or more images;
    quantify the one or more objects of interest within the one or more images; and
    generate a signal indicative of quantification of the one or more objects of interest within the one or more images.

9. The one or more non-transitory processor readable medium of claim 8, wherein the processor executable instructions further causes the one or more processor to filter the one or more images to correct for uneven lighting and generate one or more filtered image.

10. The one or more non-transitory processor readable medium of claim 9, wherein the processor executable instructions further causes the one or more processor to transform the one or more filtered image to one or more binary image.

11. The one or more non-transitory processor readable medium of claim 8, wherein the one or more objects of interest are one or more bubbles and wherein filtering the one or more images comprises changing one or more color values of pixels within the one or more images to increase contrast indicative of the one or more bubbles comprising foam.

12. The one or more non-transitory processor readable medium of claim 11, wherein filtering the one or more images comprises applying a band pass filter to pixels of the one or more images.

13. The one or more non-transitory processor readable medium of claim 8, wherein differentiating between the one or more objects of interest and the other objects comprises analyzing the one or more images to distinguish between the one or more bubbles comprising foam and the other objects, and wherein the one or more bubbles are the one or more objects of interest.

14. The one or more non-transitory processor readable medium of claim 13, wherein the processor executable instructions when executed by the one or more processor cause the one or more processor to identify the one or more objects of interest in the cured substrate coating by a comparison of groups of pixels to features from a group comprising: circles, arcs, bubble cluster formations, radii, ellipses, circular elements, and shape descriptors describing non-circular objects.

15. The one or more non-transitory processor readable medium of claim 8, wherein quantifying the one or more objects of interest is defined further as quantifying at least one of a number of objects per a predetermined area, a size distribution of the objects, a population of cumulative frequency curves, and kinetics of reduction of objects diameter and count.

16. A product testing apparatus, comprising:
    one or more imager configured to capture one or more images of a sample having a cured substrate coating applied to a substrate;
    a processor in communication with the one or more imager; and
    a non-transitory processor readable medium, in communication with the processor, storing processor executable instructions that when executed cause the processor to:
        receive the one or more images of the cured substrate coating from the one or more imager;
        process the one or more images by filtering lighting variations in pixels of the one or more images to identify one or more objects of interest in the one or more images of the cured substrate coating;
        quantify the one or more objects of interest; and
        generate one or more signal indicative of the quantification of the one or more objects of interest.

17. The product testing apparatus of claim 16 further comprising a light source configured to illuminate the sample to be imaged.

18. The product testing apparatus of claim 16, wherein processing the one or more images further comprises converting the one or more images to one or more binary images.

19. The product testing apparatus of claim 16, wherein the one or more objects of interest are bubbles comprising foam.

20. The product testing apparatus of claim 16, wherein the processor executable instructions when executed by the processor cause the processor to identify the one or more objects of interest in the cured substrate coating by a comparison of groups of pixels to features from a group comprising: circles, arcs, bubble cluster formations, radii, ellipses, and circular elements.

21. The product testing apparatus of claim 16, wherein quantifying the one or more objects of interest is defined further as quantifying at least one of a number of objects per a predetermined area, a size distribution of the objects, a population of cumulative frequency curves, and kinetics of reduction of object diameter and count.

* * * * *